US011384214B2

(12) United States Patent
Cocquet et al.

(10) Patent No.: US 11,384,214 B2
(45) Date of Patent: Jul. 12, 2022

(54) BLOCK COPOLYMER FOAM (71) Applicant: Arkema France, Colombes (FR)

(72) Inventors: Clio Cocquet, Bernay (FR); Quentin P. Pineau, Evreux (FR); Helena Cheminet, Whitefish Bay, WI (US); Francois Fernagut, Le Val David (FR)

(73) Assignee: ARKEMA FRANCE, Colombes (FR)

( * ) Notice: Subject to any disclaimer, the term of this patent is extended or adjusted under 35 U.S.C. 154(b) by 214 days.

(21) Appl. No.: 16/763,571

(22) PCT Filed: Nov. 16, 2018

(86) PCT No.: PCT/FR2018/052869
§ 371 (c)(1),
(2) Date: May 13, 2020

(87) PCT Pub. No.: WO2019/097178
PCT Pub. Date: May 23, 2019

(65) Prior Publication Data
US 2021/0292507 A1 Sep. 23, 2021

(30) Foreign Application Priority Data
Nov. 17, 2017 (FR) ...................... 17.60878

(51) Int. Cl.
C08J 9/00 (2006.01)
C08J 9/04 (2006.01)
C08G 81/02 (2006.01)

(52) U.S. Cl.
CPC .......... C08J 9/0061 (2013.01); C08G 81/025 (2013.01); C08G 81/027 (2013.01); C08G 81/028 (2013.01); C08G 2110/0041 (2021.01); C08G 2410/00 (2013.01); C08J 2201/03 (2013.01); C08J 2323/08 (2013.01); C08J 2331/04 (2013.01); C08J 2333/08 (2013.01); C08J 2333/10 (2013.01); C08J 2367/08 (2013.01); C08J 2371/02 (2013.01); C08J 2377/00 (2013.01); C08J 2379/08 (2013.01)

(58) Field of Classification Search
CPC .. C08J 9/0061; C08J 2201/03; C08J 2323/08; C08J 2331/04; C08J 2333/08; C08J 2333/10; C08J 2367/08; C08J 2371/02; C08J 2377/00; C08J 2379/08; C08J 2377/02; C08J 2203/06; C08J 2377/12; C08J 9/122; C08J 9/12; C08G 81/025; C08G 81/027; C08G 81/028; C08G 2110/0041; C08G 2410/00; C08G 69/40; C08L 77/02; C08L 79/00
See application file for complete search history.

(56) References Cited

U.S. PATENT DOCUMENTS

| | | | |
|---|---|---|---|
| 4,984,376 A | 1/1991 | Walter et al. | |
| 4,988,740 A | 1/1991 | Walter et al. | |
| 5,360,888 A * | 11/1994 | Ullrich .................... | C08L 77/00 528/323 |
| 9,472,317 B2 * | 10/2016 | Mitsunaga ............. | H01B 3/423 |
| 10,392,488 B2 | 8/2019 | Daschlein et al. | |
| 11,008,464 B2 | 5/2021 | Cocquet et al. | |
| 11,332,576 B2 | 5/2022 | Malet et al. | |
| 2013/0303645 A1 | 11/2013 | Dix et al. | |
| 2014/0235741 A1 * | 8/2014 | Shinohara .................. | C08J 9/18 521/182 |
| 2019/0071570 A1 | 3/2019 | Cocquet et al. | |

FOREIGN PATENT DOCUMENTS

| | | |
|---|---|---|
| CN | 102918082 A | 2/2013 |
| EP | 1 650 255 A1 | 4/2006 |
| JP | 2012072358 | 4/2012 |
| JP | 2012072358 A * | 4/2012 |
| WO | 2017129913 A1 | 8/2017 |

OTHER PUBLICATIONS

Office Action (the First Office Action) dated Feb. 8, 2022, by the China National Intellectual Property Administration in corresponding Chinese Patent Application No. 201880074560.8, and an English Translation of the Office Action. (17 pages).

* cited by examiner

Primary Examiner — Kara B Boyle
(74) Attorney, Agent, or Firm — Buchanan Ingersoll & Rooney P.C.

(57) ABSTRACT

The invention relates to a noncrosslinked block copolymer foam, comprising at least one rigid block and at least one flexible block, in which the copolymer includes at least one carboxylic acid chain end blocked with a polycarbodiimide. The invention also relates to a process for manufacturing this foam and to articles manufactured therefrom.

18 Claims, 2 Drawing Sheets

Figure 1

Elongational rheology

Copo 3 according to the invention (top curve)
compared to PEBA 3 (bottom curve)

Figure 2

Elongational rheology

Copo 4 according to the invention (top curve)
compared to PEBA 4 (bottom curve)

BLOCK COPOLYMER FOAM

This application claims benefit, under U.S.C. § 119 or § 365 of PCT Application Number PCT/FR2018/052869, filed Nov. 16, 2018, and French Patent Applications Number FR 17.60876, filed Nov. 17, 2017, these documents being incorporated herein by reference.

FIELD OF THE INVENTION

The present invention relates to a foam formed from a copolymer with rigid blocks, such as polyamide (PA), and with flexible blocks, such as polyether (PE) or polyester (PES), and also to a process for manufacturing same.

TECHNICAL BACKGROUND

Various polymeric foams are used notably in the field of sports equipment, such as soles or sole components, gloves, rackets or golf balls, personal protection items in particular for practicing sports (jackets, interior parts of helmets, shells, etc.).

Such applications require a set of particular physical properties which ensure a capacity for rebounding and a capacity for enduring repeated impacts without becoming deformed and for returning to the initial shape.

EP 0405227 and EP 0402883 describe foams manufactured from various polymers and the use thereof in shoe soles.

EP 1650255 describes crosslinked foams obtained from copolymers containing polyamide blocks and polyether blocks.

Crosslinked foams have the drawback of having high constraints from the point of view of the manufacturing process: the manufacturing time is generally long, the manufacture is generally in batch mode, and undesirable chemical products must be handled.

In addition, crosslinked foams are difficult to recycle after use.

WO 2013/148841 describes a process of two-layer extrusion using various polymers, including copolymers containing polyamide blocks and polyether blocks.

WO 2015/052265 describes a process for manufacturing expanded thermoplastic particles using any elastomeric thermoplastic polymer.

Moreover, the company Zotefoams markets crosslinked foams manufactured from copolymers containing polyamide blocks and polyether blocks, under the name ZOTEK®PEBA. The drawbacks of crosslinking have been recalled above. Furthermore, the durability of the products is not ideal.

There also exist many foams manufactured from thermoplastic polyurethane (TPU) or from ethylene-vinyl acetate (EVA). These foams have a relatively narrow working temperature range, and also relatively low drawability, and durability that is not ideal. The processes for manufacturing them are also constraining.

There is thus a need to provide low-density polymeric foams, having one or more advantageous properties from among:
- better drawability, which is a fundamental property during implementation in foam form
- a lower achievable minimum density, preferably less than 300 kg/m$^3$
- a high capacity to restore elastic energy (rebound) under low-stress loading.

SUMMARY OF THE INVENTION

The invention relates firstly to a noncrosslinked block copolymer foam, comprising at least one rigid block and at least one flexible block, characterized in that the copolymer includes at least one carboxylic acid chain end blocked with a polycarbodiimide. Preferably, the polycarbodiimide has a weight-average molecular mass of greater than 10 000 g/mol.

Advantageously, the weight-average molecular mass of the polycarbodiimide is within the range from 10 000 to 40 000 g/mol, preferably from 15 000 to 30 000 g/mol. Preferably, the weight content of the polycarbodiimide represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of the copolymer.

Advantageously, said carboxylic acid forms a urea bond by reaction with a carbodiimide function of the polycarbodiimide.

Advantageously, the copolymer is in noncrosslinked linear form, its dispersity Mw/Mn being less than 3.

Advantageously, said rigid block comprises at least one block chosen from: polyamide, polyurethane, polyester, and mixtures or copolymers thereof.

Advantageously, said flexible block comprises at least one block chosen from: polyether, polyester, polysiloxane, polyolefin, polycarbonate, and mixtures or copolymers thereof.

According to a preferred embodiment of the invention, said flexible block comprises at least one polyether PE, preferably chosen from PTMG, PPG, PO3G and/or PEG.

According to another preferred embodiment of the invention, said flexible block comprises at least one polyester PES, preferably chosen from polyester diols, poly(caprolactone) and polyesters based on fatty acid dimers.

Preferably, said rigid block comprises at least one polyamide PA, preferably comprising at least one of the following polyamide units: 11, 12, 6, 610, 612, 1010, 1012, and mixtures or copolyamides thereof.

Preferably, the weight ratio of the PA blocks to the flexible blocks is within the range from 0.3 to 10, preferably from 0.3 to 6, preferably from 0.3 to 3, preferably from 0.3 to 2.

Advantageously, the foam according to the invention has a density of less than or equal to 800 kg/m$^3$, preferably less than or equal to 600 kg/m$^3$, more particularly preferably less than or equal to 400 kg/m$^3$, or even less than or equal to 300 kg/m$^3$, better still less than or equal to 250 kg/m$^3$, or better still less than or equal to 220 kg/m$^3$.

According to a particular embodiment of the invention, the foam also contains one or more additives, preferably chosen from copolymers of ethylene and of vinyl acetate, copolymers of ethylene and of acrylate, and copolymers of ethylene and of alkyl (meth)acrylate.

A subject of the present invention is also the use of at least one polycarbodiimide in a block copolymer for improving the capacity of said copolymer to be transformed in foam form while at the same time conserving its recyclability, in which said block copolymer comprises at least one rigid block and at least one flexible block and includes at least one carboxylic acid chain end blocked with said polycarbodiimide. Advantageously, the polycarbodiimide has a weight-average molecular mass of greater than 10 000 g/mol, preferably within the range from 10 000 to 40 000 g/mol, preferably from 15 000 to 30 000 g/mol.

Advantageously, the weight content of the polycarbodiimide represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of copolymer. Advantageously, said carboxylic acid forms a urea bond by reaction with a carbodiimide function of the polycarbodiimide.

A subject of the present invention is also a process for manufacturing a foam according to the invention, comprising a step of mixing the copolymer as defined by the invention in molten form including at least one carboxylic acid chain end blocked with a polycarbodiimide, optionally with one or more additives, and with an expansion agent, and a step of foaming the mixture of copolymer and of expansion agent.

According to one embodiment of the process of the invention, the expansion agent is a physical expansion agent, preferably chosen from dinitrogen, carbon dioxide, hydrocarbons, chlorofluorocarbons, hydrochlorocarbons, hydrofluorocarbons, hydrochlorofluorocarbons, and mixtures thereof.

According to a preferred embodiment, the process according to the invention comprises a step of injecting the mixture of copolymer and of expansion agent into a mold, the foaming of the mixture being performed by opening the mold.

A subject of the present invention is also an article consisting of a foam according to the invention, or an article comprising at least one element consisting of a foam according to the invention.

Advantageously, the article according to the invention is chosen from: a foam panel, a foam particle, a rod, a tube, an injection-molded and/or extruded part, a finished or semi-finished object, a hollow object, and another object of any possible shape and any possible size made of foam.

Advantageously, the article according to the invention is chosen from: a shoe sole, notably for sports shoes, such as an insole, midsole or outer sole, a ski boot inner shoe, a sock, a racket, an inflatable ball, a solid ball, a floater, gloves, personal protection equipment, a helmet, a rail sole, a motor vehicle part, a pushchair part, a tire, a wheel, a smooth-riding wheel such as a tire, a handle, a seat element, a child car seat part, a construction part, an electrical and/or electronic equipment part, an electronic protection part, an audio equipment, acoustic insulation and/or heat insulation part, a part serving to dampen impacts and/or vibrations, such as those generated by a means of transport, a padding element, a toy, a medical object, such as a brace, an orthosis, a cervical collar, a dressing, notably an antimicrobial foam dressing, an art or handicraft object, a safety jacket, a backpack, a membrane, a carpet, a sports mat, a sports floor covering, a carpet underlay, and any article comprising a mixture of these articles.

The present invention makes it possible to overcome the drawbacks of the prior art. It more particularly provides low-density recyclable polymeric foams with a high capacity for restoring elastic energy under low-stress loading.

This is accomplished by means of the use of a noncrosslinked block copolymer containing rigid blocks and flexible blocks, characterized by at least one carboxylic acid chain end blocked with a polycarbodiimide.

DESCRIPTION OF EMBODIMENTS OF THE INVENTION

In the present description, it is pointed out that when reference is made to ranges, expressions of the type "ranging from . . . to . . . " or "including/comprising from . . . to . . . " include the limits of the range. Conversely, expressions of the type "between . . . and . . . " exclude the limits of the range.

Unless otherwise mentioned, the percentages expressed are mass percentages. Unless otherwise mentioned, the parameters to which reference is made are measured at atmospheric pressure and at room temperature (20-25° C., generally 23° C.).

The invention is now described in greater detail and in a nonlimiting manner in the description that follows.

A subject of the invention is thus a noncrosslinked block copolymer foam, comprising at least one rigid block and at least one flexible block, in which the copolymer includes at least one carboxylic acid chain end blocked with a polycarbodiimide.

According to the invention, the term "block copolymer" means thermoplastic elastomer (TPE) polymers, which comprise, in alternance, "hard" or "rigid" blocks or segments (with rather thermoplastic behavior) and "supple" or "flexible" blocks or segments (with rather elastomeric behavior).

The term "thermoplastic elastomer polymer", abbreviated as "TPE", denotes a polymer which constitutes a polyphasic material having at least two transitions, namely a first transition at a temperature T1 (in general this is the glass transition temperature) and a second transition at a temperature T2 above T1 (in general this is the melting point). At a temperature below T1 the material is rigid, between T1 and T2 it has elastic behavior, and above T2 it is molten. Such a polymer combines the elastic behavior of materials of rubber type with the transformability of thermoplastics.

More precisely, a block is said to be "flexible" if it has a low glass transition temperature (Tg). The term "low glass transition temperature" means a glass transition temperature Tg below 15° C., preferably below 0° C., advantageously below −15° C., even more advantageously −30° C., optionally below −50° C.

For example, polyamide blocks are known to be "rigid" segments with a melting point (Tm) or glass transition temperature (Tg) that are higher than the working temperature of the polymer, whereas polyether blocks are "flexible" segments with a Tm or Tg that are lower than the working temperature of said polymer.

The term "flexible or soft blocks that may be envisaged in the copolymer according to the invention" notably means those chosen from polyether blocks, polyester blocks, polysiloxane blocks, such as polydimethylsiloxane or PDMS blocks, polyolefin blocks, polycarbonate blocks, and mixtures thereof. The flexible blocks that may be envisaged are described, for example, in French patent application No.: 0950637, page 32 line 3 to page 38 line 23. By way of example, the polyether blocks are chosen from poly(ethylene glycol) (PEG), poly(1,2-propylene glycol) (PPG), poly(1,3-propylene glycol) (PO3G), poly(tetramethylene glycol) (PTMG), and copolymers or mixtures thereof.

The rigid blocks may be based on polyamide, polyurethane, polyester or a mixture of these polymers. These blocks are notably described in French patent application No.: 0856752. The rigid blocks are preferably polyamide-based. The polyamide (abbreviated as PA) blocks may include homopolyamides or copolyamides. The polyamide blocks that may be envisaged in the composition of the invention are notably those defined in the application FR0950637 from page 27 line 18 to page 31 line 14.

Advantageously, said at least one block copolymer comprises at least one block chosen from: polyether blocks, polyester blocks, polyamide blocks, polyurethane blocks, and mixtures thereof.

As examples of copolymers containing hard blocks and flexible blocks, mention may be made, respectively, of (a) copolymers containing polyester blocks and polyether blocks (also known as COPE or copolyetheresters), (b) copolymers containing polyurethane blocks and polyether blocks (also known as TPU which is the abbreviation for thermoplastic polyurethanes) and (c) copolymers containing polyamide blocks and flexible blocks, preferably copolymers containing polyamide blocks and polyether blocks (also known as PEBA according to the IUPAC, or polyether-block-amide).

(a) As regards the COPEs or copolyetheresters, they are copolymers containing polyester blocks and polyether blocks. They consist of flexible polyether blocks derived from polyetherdiols and of rigid polyester blocks which result from the reaction of at least one dicarboxylic acid with at least one chain-extending short diol unit. The polyester blocks and the polyether blocks are connected via ester bonds resulting from the reaction of the acid functions of the dicarboxylic acid with the OH functions of the polyetherdiol. The sequence of polyethers and of diacids forms the flexible blocks whereas the sequence of glycol or of butanediol with diacids forms the rigid blocks of the copolyetherester. The chain-extending short diol may be chosen from the group consisting of neopentyl glycol, cyclohexanedimethanol and aliphatic glycols of formula HO(CH2)nOH in which n is an integer ranging from 2 to 10.

Advantageously, the diacids are aromatic dicarboxylic acids containing from 8 to 14 carbon atoms. Up to 50 mol % of the aromatic dicarboxylic acid may be replaced with at least one other aromatic dicarboxylic acid containing from 8 to 14 carbon atoms, and/or up to 20 mol % may be replaced with an aliphatic dicarboxylic acid containing from 2 to 14 carbon atoms.

As examples of aromatic dicarboxylic acids, mention may be made of terephthalic acid, isophthalic acid, dibenzoic acid, naphthalenedicarboxylic acid, 4,4'-diphenylenedicarboxylic acid, bis(p-carboxyphenyl)methane acid, ethylenebis-p-benzoic acid, 1-4 tetramethylenebis(p-oxybenzoic acid), ethylenebis(p-oxybenzoic acid) and 1,3-trimethylenebis(p-oxybenzoic acid).

As examples of glycols, mention may be made of ethylene glycol, 1,3-trimethylene glycol, 1,4-tetramethylene glycol, 1,6-hexamethylene glycol, 1,3-propylene glycol, 1,8-octamethylene glycol, 1,10-decamethylene glycol and 1,4-cyclohexylenedimethanol. The copolymers containing polyester blocks and polyether blocks are, for example, copolymers containing polyether units derived from polyetherdiols such as polyethylene glycol (PEG), polypropylene glycol (PPG), polytrimethylene glycol (PO3G) or polytetramethylene glycol (PTMG), dicarboxylic acid units such as terephthalic acid and glycol (ethanediol) or 1,4-butanediol units. Such copolyetheresters are described in patents EP 402 883 and EP 405 227. These copolyetheresters are thermoplastic elastomers. They may contain plasticizers.

(b) As regards the TPUs, mention may be made of polyetherurethanes which result from the condensation of flexible polyether blocks which are polyetherdiols and of rigid polyurethane blocks derived from the reaction of at least one diisocyanate which may be chosen from aromatic diisocyanates (e.g.: MDI, TDI) and aliphatic diisocyanates (e.g.: HDI or hexamethylene diisocyanate) with at least one short diol. The chain-extending short diol may be chosen from the glycols mentioned above in the description of the copolyetheresters. The polyurethane blocks and the polyether blocks are connected via bonds resulting from the reaction of the isocyanate functions with the OH functions of the polyetherdiol.

Mention may also be made of polyesterurethanes which result from the condensation of flexible polyester blocks which are polyesterdiols and of rigid polyurethane blocks derived from the reaction of at least one diisocyanate with at least one short diol. The polyesterdiols result from the condensation of dicarboxylic acids advantageously chosen from aliphatic dicarboxylic diacids containing from 2 to 14 carbon atoms and of glycols which are chain-extending short diols chosen from the glycols mentioned above in the description of the copolyetheresters. They may contain plasticizers.

(c) As regards the copolymers containing polyamide blocks and flexible blocks, they form part of the thermoplastic elastomer polymers on a polyamide base (abbreviated hereinbelow as TPE-A) for the purposes of the invention.

A TPE-A is a block copolymer comprising an alternating sequence of rigid or hard blocks (HB) and flexible or soft blocks (SB), according to the following general formula:

-[HB-SB]$_n$- and in which:
  HB or Hard Block or rigid block: represents a block comprising polyamide (homopolyamide or copolyamide) or a mixture of blocks comprising polyamide (homopolyamide or copolyamide), abbreviated independently hereinbelow as PA or HB block;
  SB or Soft Block or flexible block: represents a block based on polyether (PE block), polyester (PES block), polysiloxane (Psi), preferably polydimethylsiloxane (PDMS block), polyolefin (PO block), polycarbonate (PC block) and/or any other polymer with a low glass transition temperature, or mixtures thereof in the form of alternating, statistical or block copolymers. Preferably, SB is a block totally or partly based on polyether including ethylene oxide units.
  n represents the number of repeating units in the unit -HB-SB- of said copolymer. n is within the range extending from 1 to 60, preferably from 5 to 30 or better still from 6 to 20.

For the purposes of the invention, the expression "low glass transition temperature" for a polymer included in the composition of an SB means a glass transition temperature Tg below 15° C., preferably below 0° C., preferably below −15° C., more preferably below −30° C. By way of example, said soft block may be based on PEG with a number-average molecular mass equal to 1500 g/mol and a Tg of the order of −35° C. Said glass transition temperature Tg may also be below −50° C., notably in the case where said soft block is based on PTMG.

Copolyether block amides, also known as copolymers containing polyether blocks and polyamide blocks, abbreviated as "PEBA", result from the polycondensation of polyamide blocks bearing reactive ends with polyether blocks bearing reactive ends, such as, inter alia:

1) polyamide blocks bearing diamine chain ends with polyoxyalkylene blocks bearing dicarboxylic chain ends;

2) polyamide blocks bearing dicarboxylic chain ends with polyoxyalkylene blocks bearing diamine chain ends, obtained by cyanoethylation and hydrogenation of α,ω-dihydroxylated aliphatic polyoxyalkylene blocks, known as polyetherdiols;

3) polyamide blocks bearing dicarboxylic chain ends with polyetherdiols, the products obtained being, in this particular case, polyetheresteramides.

The polyamide blocks bearing dicarboxylic chain ends originate, for example, from the condensation of polyamide precursors in the presence of a chain-limiting dicarboxylic acid. The polyamide blocks bearing diamine chain ends originate, for example, from the condensation of polyamide precursors in the presence of a chain-limiting diamine.

The number-average molecular mass Mn of the polyamide blocks is between 400 and 20 000 g/mol and preferably between 500 and 10 000 g/mol.

The polymers containing polyamide blocks and polyether blocks may also comprise randomly distributed units.

Three types of polyamide blocks may advantageously be used.

According to a first type, the polyamide blocks originate from the condensation of a dicarboxylic acid, in particular those containing from 4 to 20 carbon atoms, preferably those containing from 6 to 18 carbon atoms, and of an aliphatic or aromatic diamine, in particular those containing from 2 to 20 carbon atoms, preferably those containing from 6 to 14 carbon atoms.

As examples of dicarboxylic acids, mention may be made of 1,4-cyclohexanedicarboxylic acid, butanedioic acid, adipic acid, azelaic acid, suberic acid, sebacic acid, dodecanedicarboxylic acid, octadecanedicarboxylic acid, terephthalic acid and isophthalic acid, but also dimerized fatty acids.

As examples of diamines, mention may be made of tetramethylenediamine, hexamethylenediamine, 1,10-decamethylenediamine, dodecamethylenediamine, trimethylhexamethylenediamine, the isomers of bis(4-aminocyclohexyl)methane (BACM), bis(3-methyl-4-aminocyclohexyl)methane (BMACM) and 2-2-bis-(3-methyl-4-aminocyclohexyl)propane (BMACP), and para-aminodicyclohexylmethane (PACM), and isophoronediamine (IPDA), 2,6-bis(aminomethyl)norbornane (BAMN) and piperazine (Pip).

As regards the rigid polyamide block, the standard NF EN ISO 1874-1: 2011 defines a nomenclature for polyamides. In the present description, the term "monomer" should be taken as meaning "repeating unit". The case where a repeating unit of the polyamide consists of the combination of a diacid with a diamine is particular. It is considered that it is the combination of a diamine and of a diacid, i.e. the "diamine diacid", also called "XY", pair, in equimolar amount, which corresponds to the monomer. This is explained by the fact that, individually, the diacid or the diamine is only a structural unit, which is not enough by itself to polymerize.

Examples thereof are the blocks PA412, PA414, PA418, PA610, PA612, PA614, PA618, PA912, PA1010, PA1012, PA1014 and PA1018.

According to a second type, the polyamide blocks result from the condensation of one or more α,ω-aminocarboxylic acids and/or of one or more lactams containing from 6 to 12 carbon atoms in the presence of a dicarboxylic acid containing from 4 to 12 carbon atoms or of a diamine. As examples of lactams, mention may be made of caprolactam, oenantholactam and lauryllactam. As examples of α,ω-aminocarboxylic acids, mention may be made of aminocaproic acid, 7-aminoheptanoic acid, 11-aminoundecanoic acid and 12-aminododecanoic acid.

Advantageously, the polyamide blocks of the second type are made of polyamide 11, polyamide 12 or polyamide 6.

According to a third type, the polyamide blocks result from the condensation of at least one α,ω-aminocarboxylic acid (or a lactam), at least one diamine and at least one dicarboxylic acid.

In this case, the polyamide PA blocks are prepared by polycondensation:
- of the linear aliphatic or aromatic diamine(s) containing X carbon atoms;
- of the dicarboxylic acid(s) containing Y carbon atoms; and
- of the comonomer(s) {Z}, chosen from lactams and α,ω-aminocarboxylic acids containing Z carbon atoms and equimolar mixtures of at least one diamine containing X1 carbon atoms and of at least one dicarboxylic acid containing Y1 carbon atoms, (X1, Y1) being different from (X, Y);
- said comonomer(s) {Z} being introduced in a weight proportion ranging up to 50%, preferably up to 20%, even more advantageously up to 10% relative to the total amount of polyamide-precursor monomers;
- in the presence of a chain limiter chosen from dicarboxylic acids.

Advantageously, the dicarboxylic acid containing Y carbon atoms is used as chain limiter, which is introduced in excess relative to the stoichiometry of the diamine(s).

According to one variant of this third type, the polyamide blocks result from the condensation of at least two α,ω-aminocarboxylic acids or from at least two lactams containing from 6 to 12 carbon atoms or from one lactam and one aminocarboxylic acid not having the same number of carbon atoms, in the optional presence of a chain limiter. As examples of aliphatic α,ω-aminocarboxylic acids, mention may be made of aminocaproic acid, 7-aminoheptanoic acid, 11-aminoundecanoic acid and 12-aminododecanoic acid. As examples of lactams, mention may be made of caprolactam, oenantholactam and lauryllactam. As examples of aliphatic diamines, mention may be made of hexamethylenediamine, dodecamethylenediamine and trimethylhexamethylenediamine. An example of a cycloaliphatic diacid that may be mentioned is 1,4-cyclohexyldicarboxylic acid. As examples of aliphatic diacids, mention may be made of butanedioic acid, adipic acid, azelaic acid, suberic acid, sebacic acid, dodecanedicarboxylic acid, dimerized fatty acids (these dimerized fatty acids preferably have a dimer content of at least 98%; they are preferably hydrogenated; they are sold under the brand name Pripol® by the company Unichema, or under the brand name Empol® by the company Henkel) and α,ω-diacid polyoxyalkylenes. As examples of aromatic diacids, mention may be made of terephthalic acid (T) and isophthalic acid (I). As examples of cycloaliphatic diamines, mention may be made of bis(4-aminocyclohexyl)methane (BALM), bis(3-methyl-4-aminocyclohexyl)methane (BMACM), 2-2-bis (3-methyl-4-aminocyclohexyl)propane (BMACP) and para-aminodicyclohexylmethane (PACM) isomers. The other diamines commonly used may be isophoronediamine (IPDA), 2,6-bis(aminomethyl)norbornane (BAMN) and piperazine.

In the case where the PA blocks of the PEBA according to the invention comprise at least two different monomers, called "comonomers", i.e. at least one monomer and at least one comonomer (monomer other than the first monomer), they comprise a copolymer, such as a copolyamide, abbreviated as CoPA.

As examples of polyamide blocks of the third type, mention may be made of the following:

66/6 in which 66 denotes hexamethylenediamine units condensed with adipic acid. 6 denotes units resulting from the condensation of caprolactam.

66/610/11/12 in which 66 denotes hexamethylenediamine condensed with adipic acid. 610 denotes hexamethylenediamine condensed with sebacic acid. 11 denotes units resulting from the condensation of aminoundecanoic acid. 12 denotes units resulting from the condensation of lauryllactam.

The number-average molecular mass Mn of the flexible blocks is between 100 and 6000 g/mol and preferably between 200 and 3000 g/mol.

Preferably, the polymer comprises from 1% to 80% by mass of flexible blocks and from 20% to 99% by mass of polyamide blocks, preferably from 4% to 80% by mass of flexible blocks and from 20% to 96% by mass of polyamide blocks.

According to a preferred embodiment, the rigid polyamide block, in the copolymer containing rigid PA blocks and flexible blocks according to the invention, comprises at least one of the following polyamide units: 11, 12, 6, 610, 612, 1010, 1012, and mixtures or copolyamides thereof.

The polyether PE blocks are formed from alkylene oxide units. These units may be, for example, ethylene oxide units, propylene oxide units or tetrahydrofuran (which leads to polytetramethylene glycol sequences). Use is thus made of PEG (polyethylene glycol) blocks, i.e. blocks formed from ethylene oxide units, PPG (propylene glycol) blocks, i.e. blocks formed from propylene oxide units, PO3G (polytrimethylene glycol) blocks, i.e. blocks formed from polytrimethylene glycol ether units (such copolymers with polytrimethylene ether blocks are described in U.S. Pat. No. 6,590,065), and PTMG blocks, i.e. blocks formed from tetramethylene glycol units, also known as polytetrahydrofuran. The PEBA copolymers may comprise in their chain several types of polyethers, the copolyethers possibly being in block or statistical form.

Use may also be made of blocks obtained by oxyethylation of bisphenols, for instance bisphenol A. The latter products are described in patent EP613919.

The polyether blocks may also be formed from ethoxylated primary amines. As examples of ethoxylated primary amines, mention may be made of the products of formula:

in which m and n are between 1 and 20 and x is between 8 and 18. These products are commercially available under the brand name Noramox® from the company CECA and under the brand name Genamin® from the company Clariant.

The flexible polyether blocks may comprise polyoxyalkylene blocks bearing NH$_2$ chain ends, such blocks being able to be obtained by cyanoacetylation of α,ω-dihydroxylated aliphatic polyoxyalkylene blocks referred to as polyetherdiols. More particularly, use may be made of the Jeffamine products (for example Jeffamine® D400, D2000, ED 2003, XTJ 542, which are commercial products from the company Huntsman, also described in patents JP2004346274, JP2004352794 and EP1482011).

The polyetherdiol blocks are either used in unmodified form and copolycondensed with polyamide blocks bearing carboxylic end groups, or they are aminated to be converted into polyetherdiamines and condensed with polyamide blocks bearing carboxylic end groups. The general method for the two-step preparation of PEBA copolymers containing ester bonds between the PA blocks and the PE blocks is known and is described, for example, in French patent FR2846332. The general method for preparation of the PEBA copolymers of the invention containing amide bonds between the PA blocks and the PE blocks is known and is described, for example, in European patent EP1482011. The polyether blocks may also be mixed with polyamide precursors and a chain-limiting diacid to make polymers containing polyamide blocks and polyether blocks having randomly distributed units (one-step process).

Needless to say, the name PEBA in the present description of the invention relates not only to the Pebax® products sold by Arkema, to the Vestamid® products sold by Evonik® and to the Grilamid® products sold by EMS, but also to the Kellaflex® products sold by DSM or to any other PEBA from other suppliers.

Advantageously, the PEBA copolymers contain PA blocks as PA 6, as PA 11, as PA 12, as PA 612, as PA 66/6, as PA 1010 and/or as PA 614, preferably PA 11 and/or PA 12 blocks; and PE blocks as PTMG, as PPG and/or as PO3G. The PEBAs based on PE blocks predominantly consisting of PEG are to be categorized in the range of hydrophilic PEBAs. The PEBAs based on PE blocks predominantly consisting of PTMG are to be categorized in the range of hydrophobic PEBAs. PEBA copolymers that are particularly preferred in the context of the invention are copolymers including blocks from among:

PA 11 and PEG;
PA 11 and PTMG;
PA 12 and PEG;
PA 12 and PTMG;
PA 6.10 and PEG;
PA 6.10 and PTMG;
PA 6 and PEG;
PA 6 and PTMG.

Advantageously, said PEBA used in the composition according to the invention is at least partially obtained from biobased raw materials.

The term "raw materials of renewable origin" or "biobased raw materials" means materials which comprise biobased carbon or carbon of renewable origin. Specifically, unlike materials derived from fossil materials, materials composed of renewable starting materials contain $^{14}$C. The "content of carbon of renewable origin" or "content of biobased carbon" is determined by application of the standards ASTM D 6866 (ASTM D 6866-06) and ASTM D 7026 (ASTM D 7026-04). By way of example, the PEBAs based on polyamide 11 at least partly originate from biobased raw materials and have a content of biobased carbon of at least 1%, which corresponds to a $^{12}$C/$^{14}$C isotope ratio of at least $1.2 \times 10^{-14}$. Preferably, the PEBAs according to the invention comprise at least 50% by mass of biobased carbon relative to the total mass of carbon, which corresponds to a 12014c isotope ratio of at least $0.6 \times 10^{-12}$. This content is advantageously higher, notably up to 100%, which corresponds to a $^{12}$C/$^{14}$C isotope ratio of $1.2 \times 10^{-12}$, in the case, for example, of PEBA containing PA 11 blocks and PE blocks comprising PO3G, PTMG and/or PPG derived from starting materials of renewable origin.

The polyester PES blocks are usually manufactured by polycondensation between a dicarboxylic acid and a diol.

Suitable carboxylic acids comprise those mentioned above used for forming the polyamide blocks, with the exception of terephthalic acid and isophthalic acid. Suitable diols comprise linear aliphatic diols such as ethylene glycol, 1,3-propylene glycol, 1,4-butylene glycol, 1,6-hexylene glycol, branched diols such as neopentyl glycol, 3-methylpentane glycol, 1,2-propylene glycol, and cyclic diols such as 1,4-bis(hydroxymethyl)cyclohexane and 1,4-cyclohexanedimethanol.

The term "polyesters" also means poly(caprolactone) and PESs based on fatty acid dimers, in particular the products of the Priplast® range from the company Croda or Uniqema.

It is also possible to envisage a PES block of alternating, statistical or block "copolyester" type, containing a sequence of at least two types of PES mentioned above.

For the purposes of the invention, the term polysiloxane block (abbreviated hereinbelow as PSi) means any organosilicon polymer or oligomer of linear or cyclic, branched or crosslinked structure, obtained by polymerization of functionalized silanes, and consisting essentially of a repetition of main units in which silicon atoms are linked together via oxygen atoms (siloxane bond —Si—O—Si—), optionally substituted hydrocarbon-based radicals being directly linked via a carbon atom to said silicon atoms. The most common hydrocarbon-based radicals are alkyl radicals, notably of C1-C10 and in particular methyl, fluoroalkyl radicals, aryl radicals and in particular phenyl, and alkenyl radicals and in particular vinyl; other types of radicals that may be bonded, either directly or via a hydrocarbon-based radical, to the siloxane chain are notably hydrogen, halogens and in particular chlorine, bromine or fluorine, thiols, alkoxy radicals, polyoxyalkylene (or polyether) radicals and in particular polyoxyethylene and/or polyoxypropylene, hydroxyl or hydroxyalkyl radicals, substituted or unsubstituted amine groups, amide groups, acyloxy or acyloxyalkyl radicals, hydroxyalkylamino or aminoalkyl radicals, quaternary ammonium groups, amphoteric or betaine groups, anionic groups such as carboxylates, thioglycolates, sulfosuccinates, thiosulfates, phosphates and sulfates, and mixtures thereof, this list obviously not being in any way limiting ("organomodified" silicones).

Preferably, said polysiloxane blocks comprise polydimethylsiloxane (abbreviated hereinbelow as PDMS blocks), polymethylphenylsiloxane and/or polyvinylsiloxane.

For the purposes of the invention, the term polyolefin block (abbreviated hereinbelow as PO block) means any polymer comprising an α-olefin as monomer, i.e. homopolymers of an olefin or copolymers of at least one α-olefin and of at least one other copolymerizable monomer, the α-olefin advantageously containing from 2 to 30 carbon atoms.

As examples of α-olefins, mention may be made of ethylene, propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins may be used alone or as a mixture of two or of more than two.

Examples that may be mentioned include:
ethylene homopolymers and copolymers, in particular low-density polyethylene (LDPE), high-density polyethylene (HDPE), linear low-density polyethylene (LLDPE), very-low-density polyethylene (VLDPE) and polyethylene obtained by metallocene catalysis,
propylene homopolymers and copolymers,
essentially amorphous or atactic poly-α-olefins (APAO),
ethylene/α-olefin copolymers such as ethylene/propylene, EPR (ethylene-propylene-rubber) elastomers and EPDM (ethylene-propylene-diene) elastomers, and mixtures of polyethylene with an EPR or an EPDM,
styrene/ethylene-butene/styrene (SEBS), styrene/butadiene/styrene (SBS), styrene/isoprene/styrene (SIS) and styrene/ethylene-propylene/styrene (SEPS) block copolymers;
copolymers of ethylene with at least one product chosen from salts or esters of unsaturated carboxylic acids, for instance alkyl (meth)acrylates, the alkyl possibly containing up to 24 carbon atoms, vinyl esters of saturated carboxylic acids, for instance vinyl acetate or propionate, and dienes, for instance 1,4-hexadiene or polybutadiene.

According to an advantageous embodiment of the invention, said at least one polyolefin block comprises polyisobutylene and/or polybutadiene.

According to a particularly advantageous embodiment, the block copolymer according to the invention includes at least one flexible polyolefin block (PO block) and at least one hard hydrophilic block (abbreviated hereinbelow as hHB) comprising both polyamide and polyether, such as a polyetheramide block, a polyetheresteramide block and/or a polyetheramideimide block, etc. Said PO block preferably comprises a polyolefin including acid, alcohol or amine end groups. Preferably, the PO block is obtained by thermal degradation of high molecular weight polyolefins to form polyolefins that are of lower mass and functionalized (reference method: Japanese Kokai Publication Hei-03-62804). As regards the hHB block, it may also comprise at least one polymer chosen from: cationic polymers of quaternary amine type and/or phosphorus derivatives; and/or anionic polymers, of modified diacid type, including a sulfonate group and which are capable of reacting with a polyol. The addition of organic salt may then be envisaged in the preparation of the hHB block or during the reaction between the PO block and the hHB block. U.S. Pat. No. 6,552,131 describes the synthesis and the various possible structures for the copolymer containing PO blocks and hHB blocks, it being possible, needless to say, for the latter to be envisaged in the process according to the invention.

For the purposes of the invention, the term polycarbonate block (abbreviated hereinbelow as PC block) more particularly means any aliphatic polycarbonate. Aliphatic polycarbonates are described, for example, in DE2546534 and JP1009225. Such polycarbonate homopolymers or copolymers are also described in US471203. Patent applications WO 92/22600 and WO 95/12629 describe copolymers comprising polycarbonate blocks and also the processes for synthesizing same. The blocks (and the synthesis thereof) described in these documents may be entirely envisaged for the synthesis of a PC block copolymer according to the invention. Preferably, the polycarbonate blocks of the copolymer according to the invention have the formula:

in which a is an integer from 2 to 300; R1 and R2, which may be identical or different, represent a straight or branched, aliphatic or alicyclic chain containing from 2 to 18 carbon atoms, or represent a polyoxyalkylene group, or represent a polyester group.

The polycarbonates in which R1 and R2 are chosen from hexylene, decylene, dodecylene, 1,4-cyclohexylene, 2,2-dimethyl-1,3-propylene, 2,5-dimethyl-2,5-hexylene or polyoxyethylene groups are preferred.

If the block copolymers described above generally comprise at least one rigid polyamide block and at least one flexible block, it is obvious that the present invention in fact covers all the copolymers comprising two, three, four (or even more) different blocks chosen from those described in the present description, provided that at least one of these blocks is a polyamide block.

Advantageously, the copolymer according to the invention comprises a block segmented copolymer comprising three different types of blocks (referred to as "triblock" in the present description of the invention), which result from the condensation of several of the blocks described above. Said triblock is preferably chosen from copolyetheresteramides and copolyetheramideurethanes in which:

the mass percentage of rigid polyamide block is greater than 10%;
the mass percentage of flexible blocks is greater than 20%;

relative to the total mass of triblock.

According to a preferred embodiment, the flexible block in the copolymer containing rigid PA blocks and flexible blocks according to the invention comprises (and preferably is) a polyether PE block, preferably chosen from PTMG, PPG, PO3G and/or PEG.

According to another advantageous embodiment, the flexible block in the copolymer containing rigid PA blocks and flexible blocks according to the invention comprises (and preferably is) a polyester PES block, chosen from polyester diols, poly(caprolactone) and polyesters based on fatty acid dimers.

Advantageously, in the copolymer according to the invention, the weight ratio of the PA blocks to the flexible blocks is within the range from 0.3 to 10, preferably from 0.3 to 6, preferably from 0.3 to 3, preferably from 0.3 to 2.

Polycarbodiimides that are suitable for the present invention are represented by the following general formula:

R-[—N=C=N-R']$_n$- in which R is monovalent, R' is divalent, n is from 2 to 50, preferably from 2 to 45, preferably from 2 to 20 and preferably from 5 to 20.

R may be, for example, a C1-C20 alkyl or C3-C10 cycloalkyl or C1-C20 alkenyl group, and may be cyclic or branched, or may contain a C8-C16 aromatic nucleus, and may be substituted with functional groups.

R' may be a divalent group corresponding to all the foregoing, for example a C1-C20 alkylene, a C3-C10 cycloalkylene, etc. Examples of functional groups comprise, without being limited thereto, cyanato and isocyanato, halo, amido, carboxamido, amino, imido, imino, silyl, etc. These lists are intended solely for illustrative purposes and not for the purpose of limiting the scope of the present invention. As examples of polycarbodiimides that may be used according to the present invention, mention may be made of repeated units of N,N'-dicyclohexylcarbodiimide, N,N'-diisopropylcarbodiimide, N,N'-diphenylcarbodiimide, N,N'-bis(2,6-diisopropylphenyl)carbodiimide, 4,4'-dicyclohexylmethanecarbodiimide, tetramethylxylylenecarbodiimide (aromatic carbodiimide), N,N-dimethylphenylcarbodiimide, N,N'-bis(2,6-diisopropylphenyl)carbodiimide, 2,2',6,6'-tetraisopropyldiphenylcarbodiimide (aromatic carbodiimide), aromatic homopolymer of 1,3,5-triisopropyl-2,4-diisocyanatobenzene, aromatic heteropolymer of 1,3,5-triisopropyl-2,4-diisocyanatobenzene and 2,6-diisopropylphenyl isocyanate, or combinations thereof.

Specific examples of R' comprise, without being limited thereto however, divalent radicals derived from 2,6-diisopropylbenzene, naphthalene, 3,5-diethyltoluene, 4,4'-methylenebis(2,6-diethylenephenyl), 4,4'-methylenebis(2-ethyl-6-methylphenyl), 4,4'-methylenebis(2,6-diisopropylphenyl), 4,4'-methylenebis(2-ethyl-5-methylcyclohexyl), 2,4,6-triisopropylphenyl, n-hexane, cyclohexane, dicyclohexylmethane and methylcyclohexane, and analogs.

U.S. Pat. Nos. 5,130,360, 5,859,166, 368,493, 7,456,137, US2007/0278452, US2009/0176938, and in particular U.S. Pat. No. 5,360,888 describe more examples of polycarbodiimides.

Suitable polycarbodiimides may be obtained from commercially available sources such as the Stabaxol P series from Rhein Chemie, the Stabilizer series from Raschig, and others from Ziko or Teijin, for example.

Advantageously, the polycarbodiimide is chosen from a Stabilizer product, in particular Stabilizer® 9000 corresponding to poly(1,3,5-triisopropylphenylene-2,4-carbodiimide), a Stabaxol® product, notably a Stabaxol® P product, in particular Stabaxol® P100 or Stabaxol® P400, or a mixture thereof.

A subject of the present invention is also the use of at least one polycarbodiimide as defined above in a block copolymer as defined above, for improving the capacity of said copolymer to be transformed in foam form while at the same time conserving its recyclability, in which said block copolymer comprises at least one rigid block, preferably polyamide PA, and at least one flexible block and includes at least one carboxylic acid chain end blocked with said polycarbodiimide.

Preferably, for the use according to the invention, the polycarbodiimide has a weight-average molecular mass of greater than 10 000 g/mol.

Advantageously, the weight-average molecular mass of the polycarbodiimide used in the present invention is within the range from 10 000 to 40 000 g/mol, preferably from 15 000 to 30 000 g/mol.

Preferably, the weight-average molecular mass of the polycarbodiimide used in the present invention is measured by gel permeation chromatography (GPC) in tetrahydrofuran (THF).

The weight content of the polycarbodiimide advantageously represents from 0.5% to 10% by weight, preferably from 0.5% to 7% by weight, preferably from 0.5% to 3% by weight, preferably from 0.5% to 2.5%, preferably from 0.5% to 2% by weight, relative to the total weight of the copolymer according to the invention.

According to an advantageous embodiment of the invention, said carboxylic acid of the copolymer of which the foam according to the invention is composed forms a urea bond by reaction with a carbodiimide function of the polycarbodiimide.

One of the advantages of the specific block copolymer, with a blocked acid chain end, used in the foam according to the invention is that it remains in noncrosslinked linear form, the dispersity Mw/Mn of the copolymer being less than 3. This is surprising insofar as, in the prior art, carbodiimides are rather used for increasing the viscosity of polyamides (see, for example, patent FR3027907), notably by crosslinking them, and for improving their resistance to hydrolysis as described in U.S. Pat. No. 5,360,888. Thus, the foam according to the invention has the advantage of being recyclable by virtue of the noncrosslinked copolymer of which it is composed.

The foam of the invention includes a block copolymer as described above: preferably, only one such copolymer is used. It is, however, possible to use a mixture of two or more than two block copolymers as described above.

Preferably, the number-average molecular mass of the rigid blocks, for example polyamides, in the copolymer is from 200 to 1500 g/mol; the number-average molecular mass of the flexible blocks, for example polyethers, is from 800 to 2500 g/mol.

Preferably, the mass ratio of the rigid blocks relative to the flexible blocks of the copolymer is from 0.3 to 10. This mass ratio may be calculated by dividing the number-average molecular mass of the rigid blocks by the number-average molecular mass of the flexible blocks.

The number-average molecular mass is set by the content of chain limiter. It may be calculated according to the equation:

$$Mn = (n_{monomer}/n_{limiter}) * M_{repeating\ unit} + M_{limiter}$$

$n_{monomer}$ = number of moles of monomer
$n_{limiter}$ = number of moles of diacid in excess
$M_{repeating\ unit}$ = molar mass of repeating unit
$M_{limiter}$ = molar mass of diacid in excess According to particular embodiments, this mass ratio of the rigid blocks relative to the flexible blocks of the copolymer is from 0.3 to 6; or from 0.3 to 3; preferably from 0.3 to 2.

Preferably, the copolymer used in the invention has an instantaneous hardness of less than or equal to 55 Shore D, more preferably less than or equal to 35 Shore D. The hardness measurements may be performed according to the standard ISO 868:2003.

The block copolymer according to the invention is used for forming a foam, without a crosslinking step. The foam is formed by mixing the copolymer in molten form including at least one carboxylic acid chain end blocked with a polycarbodiimide, optionally with one or more additives, with an expansion agent, and then by performing a step of foaming the mixture of copolymer and of expansion agent.

According to one embodiment, the foam thus formed consists essentially of, or even consists of, the copolymer described above (or the copolymers, if a mixture of copolymers is used) and optionally the expansion agent, if the latter remains present in the pores of the foam, notably if it is a closed-pore foam.

In the foam according to the invention, the block copolymer may be combined with various additives, for example copolymers of ethylene and vinyl acetate or EVA (for example those sold under the name Evatane® by Arkema), or copolymers of ethylene and of acrylate, or copolymers of ethylene and of alkyl (meth)acrylate, for example those sold under the name Lotryl® by Arkema. These additives may make it possible to adjust the hardness of the foamed part, its appearance and its comfort. The additives may be added in a content of from 0 to 50% by mass, preferentially from 5% to 30% by mass, relative to the block copolymer.

The expansion agent (also known as a foaming agent) may be a chemical or physical agent.

Preferably, it is a physical agent, for instance dinitrogen or carbon dioxide, or a hydrocarbon, chlorofluorocarbon, hydrochlorocarbon, hydrofluorocarbon or hydrochlorofluorocarbon (saturated or unsaturated). For example, butane or pentane may be used.

An expansion agent is generally mixed with the copolymer in liquid or supercritical form and then converted into the gaseous phase during the foaming step.

Advantageously, the process according to the invention comprises a step of injecting the composition according to the invention, i.e. the injection of the mixture of copolymer and of physical and/or chemical foaming agent, into a mold, the foaming of the mixture, after it has been heated, being performed:
  during its injection into the mold (short shot technology), and/or
  by opening the mold (core-back technology).

According to an alternative embodiment or an embodiment complementary to the preceding one, the process according to the invention comprises the extrusion of said foamable composition, bringing about the foaming of said composition by decomposition or expansion of the foaming agent, directly on exiting the extrusion.

According to yet another embodiment, the process according to the invention comprises the heating of said foamable composition in a reactor ("batch" process), in which a pressure-surge and/or temperature-surge thermodynamic instability is created, which give(s) rise to the foaming of said composition.

According to yet another embodiment, the process according to the invention comprises the manufacture of foam particles, comprising the following steps:
  extrusion of said copolymer or mixture,
  underwater cutting of the rod obtained into granules,
  physical and/or chemical foaming of the granules in an autoclave,
  and recovery of foam particles;
or the following steps:
  extrusion of said copolymer or of said mixture,
  physical and/or chemical foaming in a die and formation of a foam rod,
  underwater cutting of the foam rod obtained,
  recovery of foam particles.

According to a preferred embodiment of the invention, the mixture of the copolymer and of the expansion agent is injected into a mold, and foaming is produced by opening the mold. This technique makes it possible directly to produce three-dimensional foamed objects having geometries of greater or lesser complexity.

It is also a technique that is relatively simple to perform, notably when compared with certain processes of melting of foamed particles as described in the prior art: specifically, the filling of the mold with foamed polymer granules followed by melting of the particles to ensure the mechanical strength of the parts without destroying the structure of the foam are complex operations.

the following are process aspects of the invention:

A process for manufacturing the foam of the invention comprising a step of mixing the copolymer in molten form including at least one carboxylic acid chain end blocked with a polycarbodiimide, optionally with one or more additives, and with an expansion agent, and a step of foaming the mixture of copolymer and of expansion agent.

The process of the above aspect of the invention, in which the expansion agent is a physical expansion agent, preferably chosen from dinitrogen, carbon dioxide, hydrocarbons, chlorofluorocarbons, hydrochlorocarbons, hydrofluorocarbons and hydrochlorofluorocarbons.

The process as described in the aspects above, comprising a step of injecting the mixture of copolymer and of expansion agent into a mold, the foaming of the mixture being performed
  during its injection into the mold, and/or
  by opening the mold.

The process as described in any of the above aspects, comprising the extrusion of the mixture of copolymer and of expansion agent, bringing about the foaming of said mixture by decomposition or expansion of the expansion agent, directly on exiting the extrusion.

The process as described in any of the above aspects, comprising the heating of the mixture of copolymer and of expansion agent, in a reactor ("batch" process), in which a pressure-surge and/or temperature-surge thermodynamic instability is created, which give(s) rise to the foaming of said composition.

The process as claimed in described in any of the above aspects, comprising the following steps:
extrusion of said copolymer or mixture,
underwater cutting of the rod obtained into granules,
physical and/or chemical foaming of the granules in an autoclave,
recovery of foam particles.

The process as claimed in described in any of the above aspects, comprising the following steps:
extrusion of said copolymer or of said mixture,
physical and/or chemical foaming in a die and formation of a foam rod,
underwater cutting of the foam rod obtained,
recovery of foam particles.

The foam produced according to the invention preferably has a density of from 50 to 800 kg/m3 and more particularly preferably from 100 to 600 kg/m3. Advantageously, the foam according to the invention has a density of less than or equal to 800 kg/m3, preferably less than or equal to 600 kg/m3, more particularly preferably less than or equal to 400 kg/m3, or even less than or equal to 300 kg/m3, better still less than or equal to 250 kg/m3, or better still less than or equal to 220 kg/m3. The density control may be achieved by adapting the parameters of the manufacturing process. Nevertheless, the lowest densities that may be achieved for the foam according to the invention result essentially from the specific block copolymer used including one or more acid chain ends blocked with polycarbodiimide.

Preferably, this foam according to the invention has a rebound resilience, according to the standard ISO 8307: 2007, of greater than or equal to 63%.

Preferably, this foam also has excellent properties in terms of fatigue resistance and dampening.

A subject of the present invention is also an article consisting of a foam according to the invention, or an article comprising at least one element consisting of a foam according to the invention.

The foam according to the invention may be used for manufacturing sports equipment, such as sports shoe soles, ski shoes, midsoles, insoles, outer soles or functional sole components, in the form of inserts in the various parts of the sole (for example the heel or the arch), or shoe upper components in the form of reinforcements or inserts into the structure of the shoe upper, or in the form of protections.

It may also be used for manufacturing inflatable balls, sports gloves (for example football gloves or boxing gloves), golf ball components, rackets, protective elements (jackets, helmet interior elements, shells, etc.).

The foam according to the invention has advantageous impact-resistance, vibration-resistance and anti-noise properties, combined with haptic properties suitable for capital goods. It may thus also be used for manufacturing railway rail soles, or various parts in the motor vehicle industry, in transport, in electrical and electronic equipment, in construction or in the manufacturing industry.

An advantage of the foam objects according to the invention is that they can be readily recycled, for example by melting them in an extruder equipped with a degassing outlet (optionally after having chopped them into pieces).

EXAMPLES

The examples that follow illustrate the invention without limiting it.

Materials Used:

In the tests that follow, use was made of PEBA 3 and PEBA 4 foams as controls, and of Copo 3 and Copo 4 foams blocked with polycarbodiimide as examples according to the invention.

PCDI: polycarbodiimide: Poly(1,3,5-triisopropylphenylene-2,4-carbodiimide), CAS-No. 29963-44-8.

PEBA 3: PA 12-PTMG (Mn: 2000-1000)

PEBA 3 is a copolymer according to the invention, containing PA 12 blocks and PTMG blocks with respective number-average molecular masses (Mn) of 2000-1000.

Copo 3: 98.5% PEBA 3 blocked with 1.5% PCDI

PEBA 4: PA11-PTMG (600-1000)

PEBA 4 is a copolymer containing PA 11 blocks and PTMG blocks with respective number-average molecular masses (Mn) of 600-1000.

Copo 5: 98% PEBA 4 blocked with 1.5% PCDI

Copo 4: 98% PEBA 4 blocked with 2% PCDI

Example 1: Measurement of the Drawability of the PEBAs and Copos by Means of a Rheotens Description of the Elongational Rheology Test:

Principle: A rod is extruded through a die of a capillary rheometer; it is gripped, in molten form, by two pairs of wheels driven by a variable-speed motor. A first pair of wheels and the motor are mounted at the free, deflectable end of a support directly connected to a sensor, representing the restoring force.

The second pair of wheels (coupled to the first pair) makes it possible to guide and to limit the winding of the rod around the upper wheels. Small pads soaked with surfactant liquid (mixture of water, ethanol and surfactant) are also applied to the wheels in order to cool them and thus to limit the sticking effect.

Figure 1:
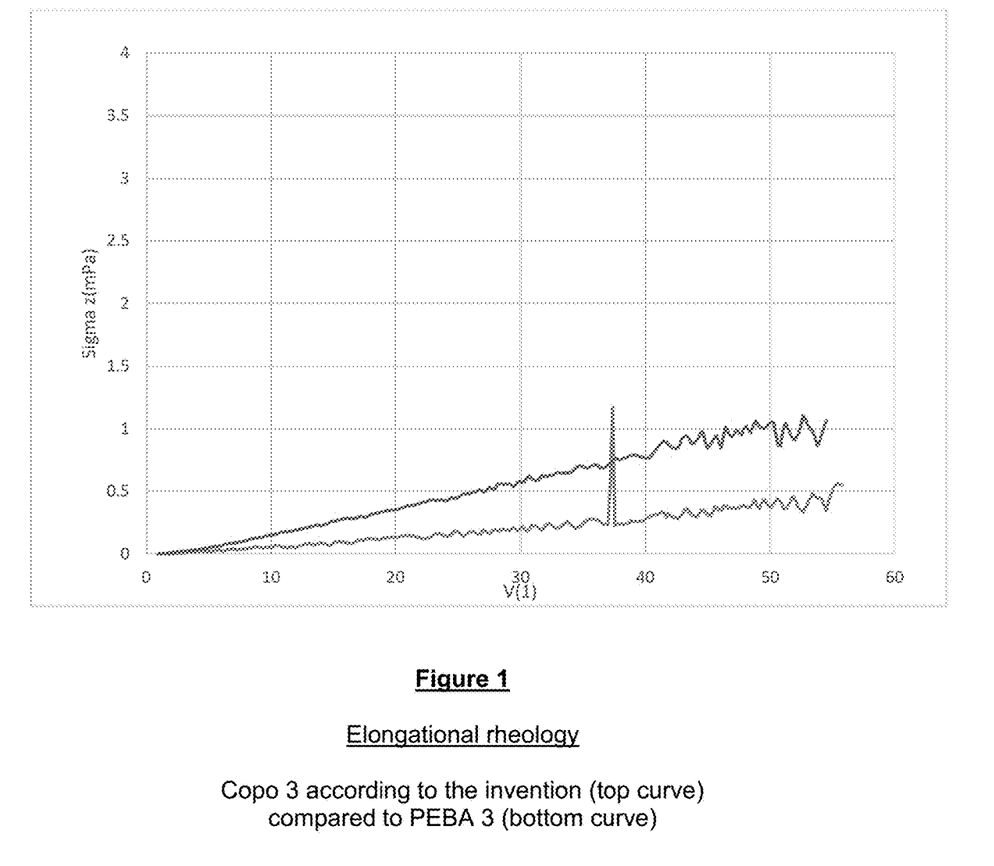
FIGS. 1 and 2 represent the results of elongational rheology measurements (see example 1) on control copolymers and copolymers used according to the invention for the manufacture of foams. The melt strength curves of FIGS. 1 and 2 represent the elongation stress on the y-axis as a function of the elongation factor on the x-axis.
Figure 2:
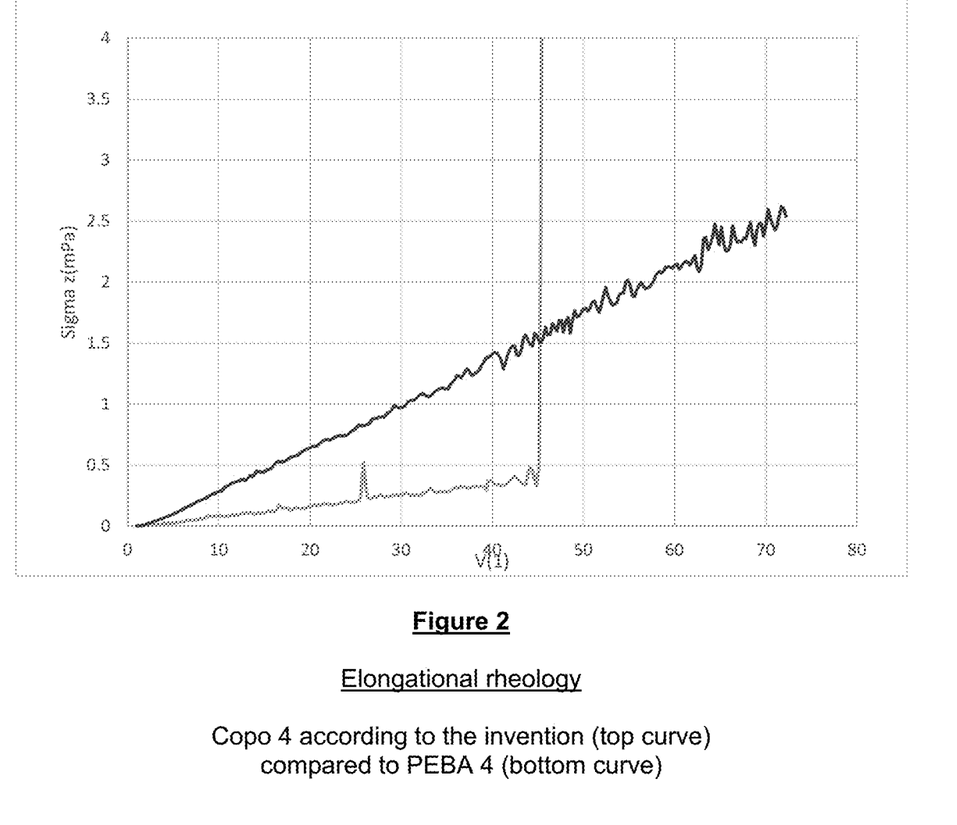

The melt strength curves of FIGS. 1 and 2 represent the elongation stress on the y-axis as a function of the elongation factor on the x-axis.

$$\text{Elongation stress:} \quad \sigma_z = \frac{F.v}{A_0.v_0}$$

$$\text{Elongation factor:} \quad V = \frac{v}{v_0}$$

with v: Speed at which the rod is drawn: wheel speed
F: Force applied by the rod
$A_0$: Area of the rod when it leaves the die
$v_0$: Extrusion speed of the rod leaving the die Operating Conditions:
Capillary rheometer:
Machine: Gottfert Rheotester 2000 capillary rheometer.
Die: 30 mm×1 mm dies L/d=30/1
Sensor: 0-1400 bar (reference 131055)
Preheating time: 300 s (5 min)
Test temperatures: 150° C. or 180° C. depending on the grades
Shear rate: 50 $s^{-1}$ Rheotens:
Wheels: Notched stainless steel
Draw height: 105 mm
Gap: about ☐0.6 mm
Vo (initial speed) ☐6 mm/s
Accelerations: a*t, a=2.4 mm/s²
Lubrication: mixture of water+surfactant
Piston diameter: 12 mm
Piston speed: 0.043 mm/s
FIG. 1 represents the result of the elongational rheology measurement on PEBA 3 (bottom curve) and on Copo 3 (top curve) at 180° C.
FIG. 2 represents the result of the elongational rheology measurement on PEBA 4 (bottom curve) and on Copo 4 (top curve) at 150° C.
The copolymers Copo 3 and Copo 4 according to the invention have improved drawability relative to that of the respective controls PEBA 3 and PEBA 4, and the Copos according to the invention thus have a better capacity to be transformed into foam form.

Example 2: Measurement of the Density and of the Rebound Resilience

The foams are manufactured from PEBA 4, Copo 4 and Copo 5, by means of an Arburg Allrounder 520A 150T injection press, with a system for injecting a physical expansion agent of Trexel series II type, using the Mucell® technology, and opening of the mold. The operating parameters are as follows:
   Sheath temperature (° C.): 230° C.
   Mold geometry (mm): 170×170×4
   Injection speed: 150 mm/s
   Maintenance time before opening the mold: 6-10 s
   Maintenance pressure: 300 MPa
   Cooling time (s): 70 s
   Mold temperature: 40° C.
   Mold opening length: up to 30 mm
   Mold opening speed: 0.28 mm/s.
The foaming agent used is dinitrogen (N2) introduced to a proportion of 1.5% by weight.
During the foam manufacturing process, the maximum possible mold opening (mm) while conserving the (size) homogeneity of the cells is measured.
The following properties of the foams obtained are evaluated:
   Density: according to the standard ISO 845:2006;
   Rebound resilience: according to the standard ISO 8307:2007 (a 16.8 g steel ball 16 mm in diameter is dropped from a height of 500 mm onto a foam sample; the rebound resilience then corresponds to the percentage of energy returned to the ball, or percentage of the initial height reached by the ball on rebound).
The results are indicated in the following table:

|  | PEBA 4 | Copa 5 | Copa 4 |
|---|---|---|---|
| Maximum mold opening (mm) while conserving the homogeneity of the cells | 12 | 14 | 16 |
| Density (kg/m³) | 300 | 250 | 220 |
| Rebound (%) | 62 | 63 | 67 |

The copolymers Copo 4 and Copo 5 according to the invention have better density properties (lower) and rebound resilience properties (higher) than those of the control PEBA 4.

Example 3—Measurement of the Dispersity of the Various PEBAs and Copos

The weight-average and number-average molecular masses Mw and Mn measured increase, respectively, on passing from a PEBA to the corresponding Copo used in the foams according to the invention, which indicates that the reaction took place between the carbodiimide function of the polycarbodiimide and the acid function of the PEBA to form the Copo bearing a blocked acid chain end used according to the invention.
The dispersity is determined as being equal to the ratio between the weight-average molecular mass and the number-average molecular mass Mw/Mn. The measurement accuracy is given to within 5%.
The number-average molecular (or molar) mass is set by the content of chain limiter. It may be calculated according to the equation:

$$Mn = (n_{monomer}/n_{limiter}) * M_{repeating\ unit} + M_{limiter}$$

$n_{monomer}$=number of moles of monomer
   $n_{limiter}$=number of moles of diacid in excess
   $M_{repeating\ unit}$=molar mass of repeating unit
   $M_{limiter}$=molar mass of diacid in excess
The dispersity Mw/Mn is moreover conserved in each copolymer used according to the invention relative to the corresponding initial PEBA, and the measured value is less than 3, in all the copolymers, which proves that the copolymers used for the foam according to the invention remained in noncrosslinked linear form. The foams based on these copolymers thus remain perfectly recyclable.
In summary, the polycarbodiimide thus used in the foam according to the present invention makes it possible to improve the following properties: stretchability and expansion of the copolymer in foam form, and the density and rebound properties, while at the same time conserving the recyclability of the foam.
These advantageous properties were not able to be observed with monomeric carbodiimides, since their volatility did not enable them to react or to effectively block said carboxylic acid of the block copolymer used in the foam of the present invention.

The invention claimed is:
1. A noncrosslinked block copolymer foam, comprising at least one rigid block and at least one flexible block, characterized in that the copolymer includes at least one carboxylic acid chain end blocked with a polycarbodiimide.
2. The foam as claimed in claim 1, wherein the weight-average molecular mass of the polycarbodiimide is greater than 10,000.
3. The foam as claimed in claim 1, wherein the weight content of the polycarbodiimide represents from 0.5% to 10% by weight, relative to the total weight of the copolymer.
4. The foam as claimed in claim 1, wherein said carboxylic acid forms a urea bond by reaction with a carbodiimide function of the polycarbodiimide.
5. The foam as claimed in claim 1, wherein the copolymer is in noncrosslinked linear form, its dispersity Mw/Mn being less than 3.
6. The foam as claimed claim 1, wherein said rigid block comprises at least one block chosen from: polyamide, polyurethane, polyester, and mixtures or copolymers thereof.

7. The foam as claimed claim 1, wherein said flexible block comprises at least one block chosen from: polyether, polyester, polysiloxane, polyolefin, polycarbonate, and mixtures or copolymers thereof.

8. The foam as claimed in claim 1, wherein said flexible block comprises at least one polyether (PE), selected from the group consisting of poly(tetramethyene glycol) (PTMG), poly(1,2-propylene glycol) (PPG), poly(1,3,propylene glycol) (P03G), poly(ethylene glycol) (PEG) and/or PEG and mixtures thereof.

9. The foam as claimed in claim 1, wherein said flexible block comprises at least one polyester (PES), selected from the group consisting of polyester diols, poly(caprolactone) and polyesters based on fatty acid dimers.

10. The foam as claimed claim 1, wherein said at least one copolymer comprises a copolymer containing polyamide blocks and polyether blocks.

11. The foam as claimed in claim 1, wherein said rigid block comprises at least one polyamide PA, comprising at least one of the following polyamide units: 11, 12, 6, 610, 612, 1010, 1012, and mixtures or copolyamides thereof.

12. The foam as claimed in claim 1, wherein the weight ratio of the rigid blocks to the flexible blocks is within the range from 0.3 to 10.

13. The foam as claimed in claim 1, wherein said foam has a density of less than or equal to 800 kg/m$^3$.

14. The foam as claimed in any claim 1, wherein said foam further comprises one or more additives, selected from the group consisting of copolymers of ethylene and of vinyl acetate, copolymers of ethylene and of acrylate, and copolymers of ethylene and of alkyl (meth)acrylate.

15. An article comprising at least one element consisting of said foam as claimed in claim 1.

16. The article of claim 15 consisting of said foam.

17. The article as claimed in claim 15, wherein said article is selected from the group consisting of: a foam panel, a foam particle, a rod, a tube, an injection-molded and/or extruded part, a finished or semifinished object, a hollow object, and an object of any possible shape and any possible size made of foam.

18. The article as claimed in claim 15, wherein said article is selected from the group consisting of: a shoe sole, sports shoes, an insole, a midsole, an outer sole, a ski boot inner shoe, a sock, a racket, an inflatable ball, a solid ball, a floater, gloves, personal protection equipment, a helmet, a rail sole, a motor vehicle part, a pushchair part, a tire, a wheel, a smooth-riding wheel, a handle, a seat element, a child car seat part, a construction part, an electrical and/or electronic equipment part, an electronic protection part, an audio equipment, acoustic insulation and/or heat insulation part, a part serving to dampen impacts and/or vibrations, a means of transport, a padding element, a toy, a medical object, a brace, an orthosis, a cervical collar, a dressing, an antimicrobial foam dressing, an art or handicraft object, a safety jacket, a backpack, a membrane, a carpet, a sports mat, a sports floor covering, a carpet underlay, and any article comprising a mixture of these articles.

* * * * *